United States Patent [19]
Wilson et al.

[11] Patent Number: 4,584,165
[45] Date of Patent: Apr. 22, 1986

[54] REDUNDANT REACTIVITY CONTROL SYSTEM

[75] Inventors: Patricia A. Wilson; Kenneth B. Stackhouse; Sujit Chakraborty, all of San Jose; Walter S. Ching, Sunnyvale; William D. Hill, San Jose; John B. Knepp, San Jose; James P. Ward, San Jose; Warren L. Zediker, Sunnyvale, all of Calif.

[73] Assignee: General Electric Company, San Jose, Calif.

[21] Appl. No.: 465,314

[22] Filed: Feb. 9, 1983

[51] Int. Cl.⁴ .............................................. G21C 7/36
[52] U.S. Cl. .................................. 376/216; 376/219; 364/527
[58] Field of Search ............... 376/216, 217, 218, 219; 364/492, 527

[56] References Cited

U.S. PATENT DOCUMENTS

| | | | |
|---|---|---|---|
| 3,959,071 | 5/1976 | Bevilaqua | 376/228 |
| 4,421,716 | 12/1983 | Hench | 376/216 |
| 4,459,259 | 7/1984 | Colley | 376/216 |

Primary Examiner—Donald P. Walsh
Attorney, Agent, or Firm—Ivor J. James, Jr.; Raymond G. Simkins

[57] ABSTRACT

A redundant reactivity control system, operating in conjunction with other systems in a nuclear power plant, to mitigate the potential consequences of an anticipated transient without scram event, is described. The invention interfaces to a boiling water nuclear reactor with the reactor's neutron monitoring system, standby liquid control system, control rod drive system, reactor recirculation system, reactor water clean-up feed water control system, and control room and local panels. Two divisionally separated control panels include associated detection and actuation logic and the necessary interface logic to other systems to perform the specific functions in response to an anticipated transient without scram event. Each separate division includes two identical channels. Actuation of any associated reactor system by the invention requires the agreement of the two channels within a division. A one channel indication actuates appropriate annunciators and alarm equipment to notify plant personnel of a possible system fault. Each divisional panel receives independent analog signals from high dome pressure transmitters, reactor low water level transmitters, and average power range monitor down-scale trip units. These inputs are combined and processed by solid state logic circuits to produce output actuation signals for interfacing systems. The present invention actuates a stand-by liquid control system to inject sodium pentaborate into a reactor core if an anticipated transient without scram event is sensed. Such insertion is made only after all other means of mitigation have not been able to reduce radioactivity, i.e. control rod insertion, recirculation pump trip, etc. The present invention provides a high degree of reliability and adds further levels of nuclear plant safety, while avoiding the possiblity of inadvertent stand-by liquid control actuation.

28 Claims, 8 Drawing Figures

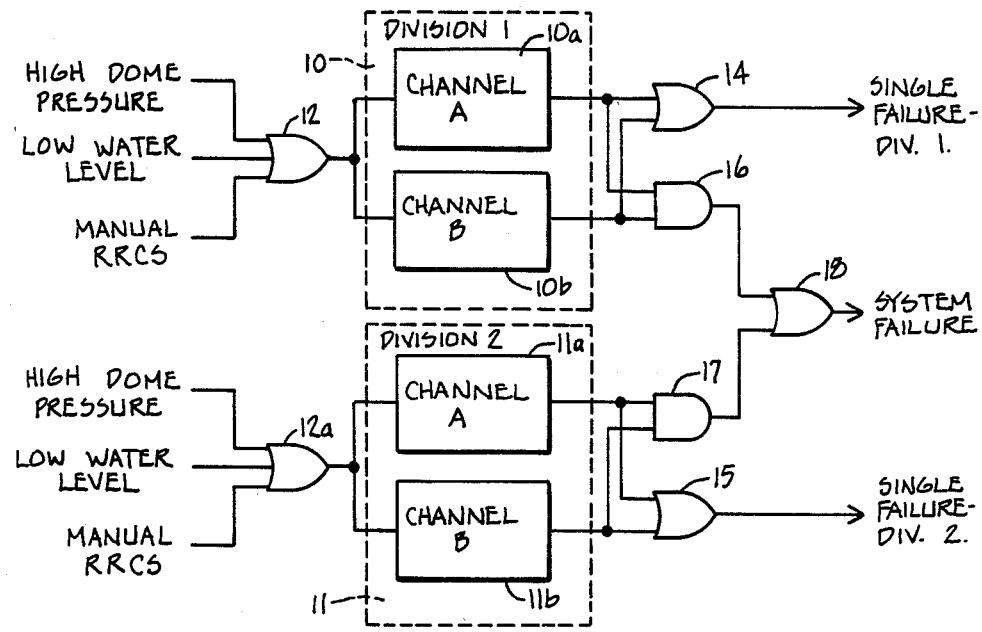
FIG._1.
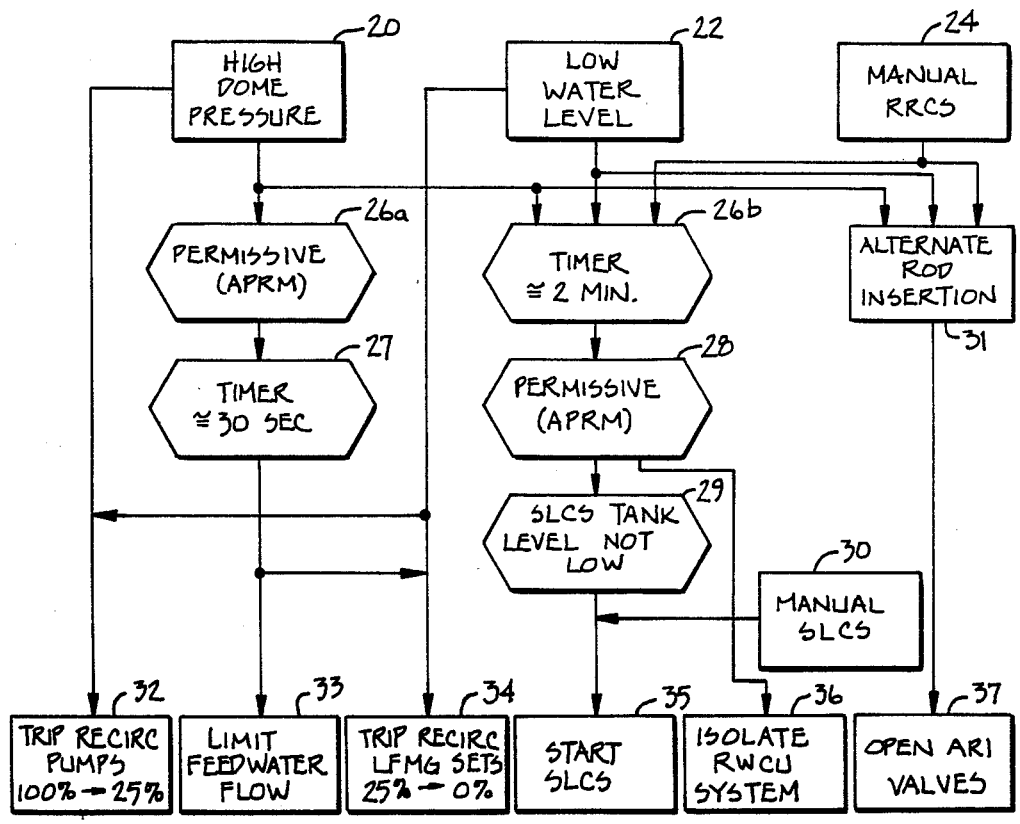
FIG._2.

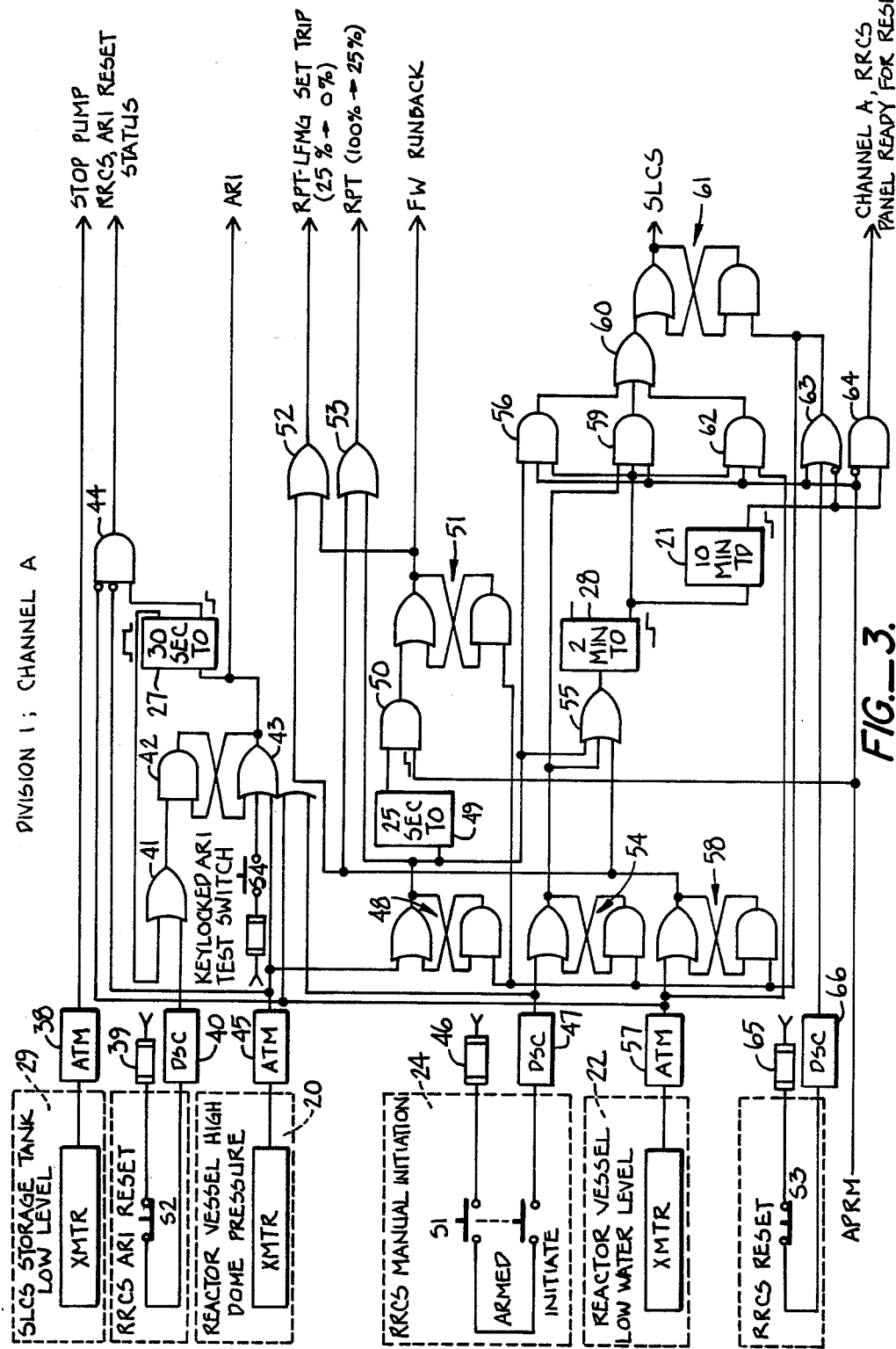
FIG._3.

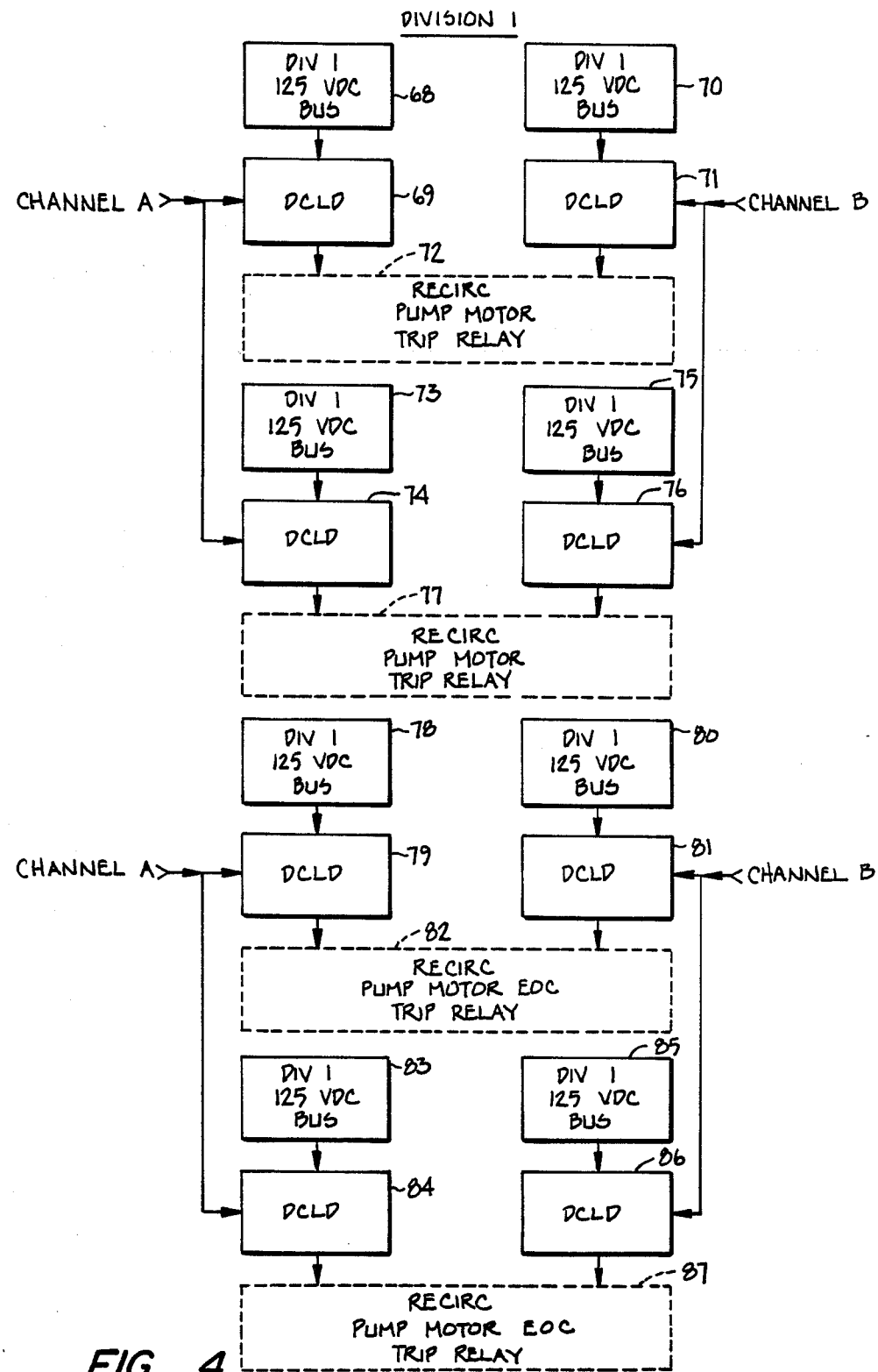
FIG._4.

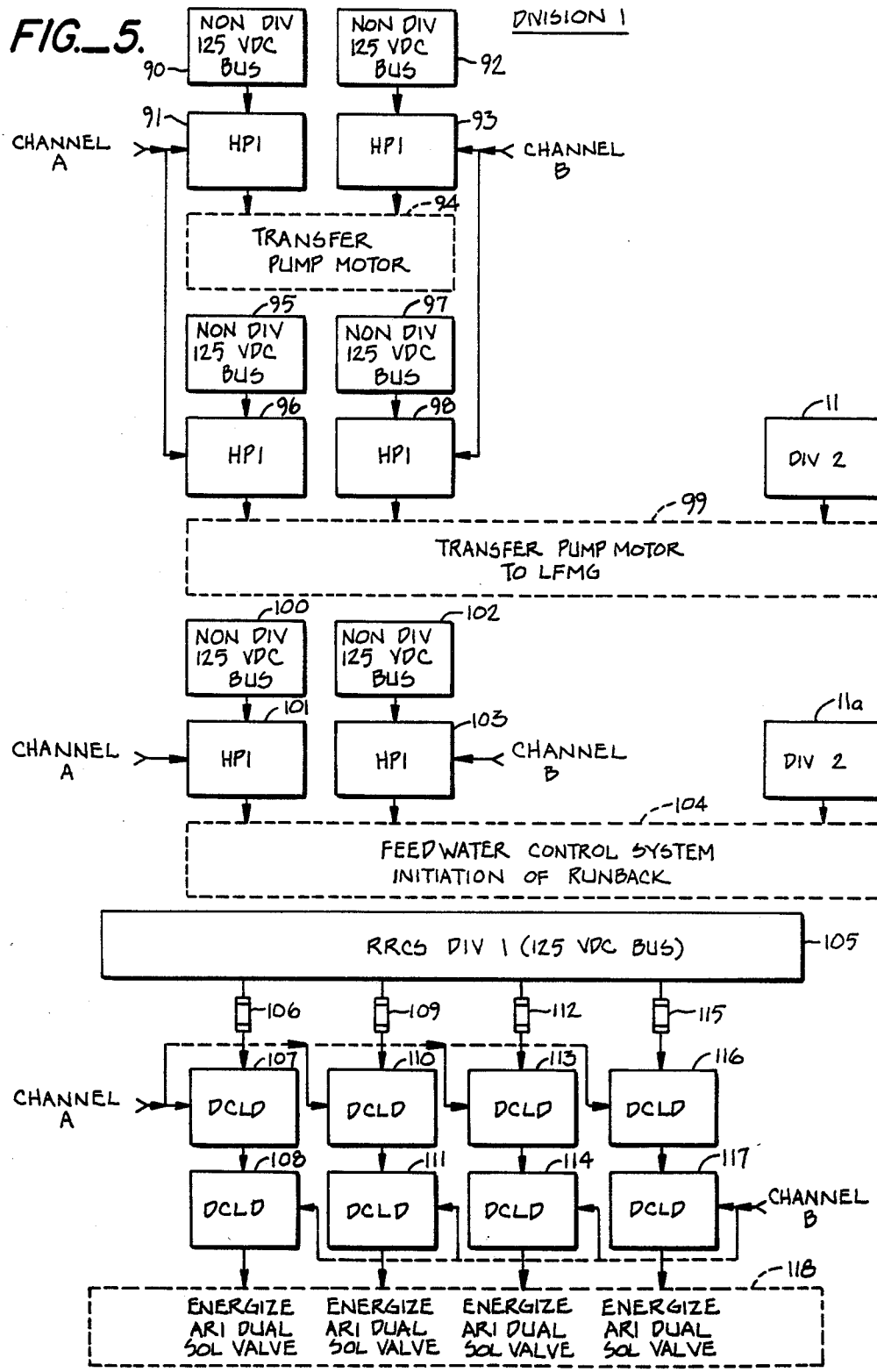
FIG._5.

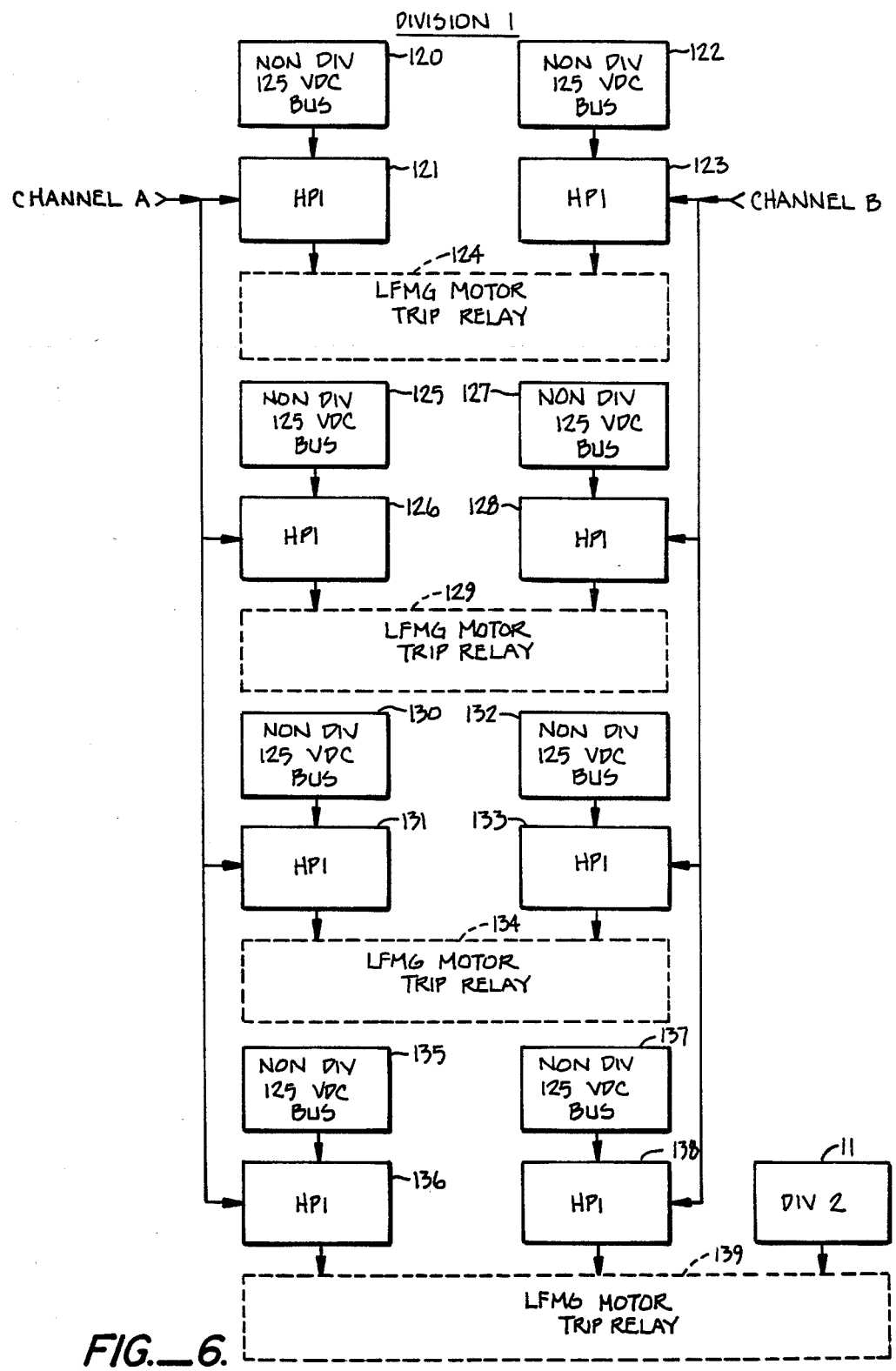
FIG._6.

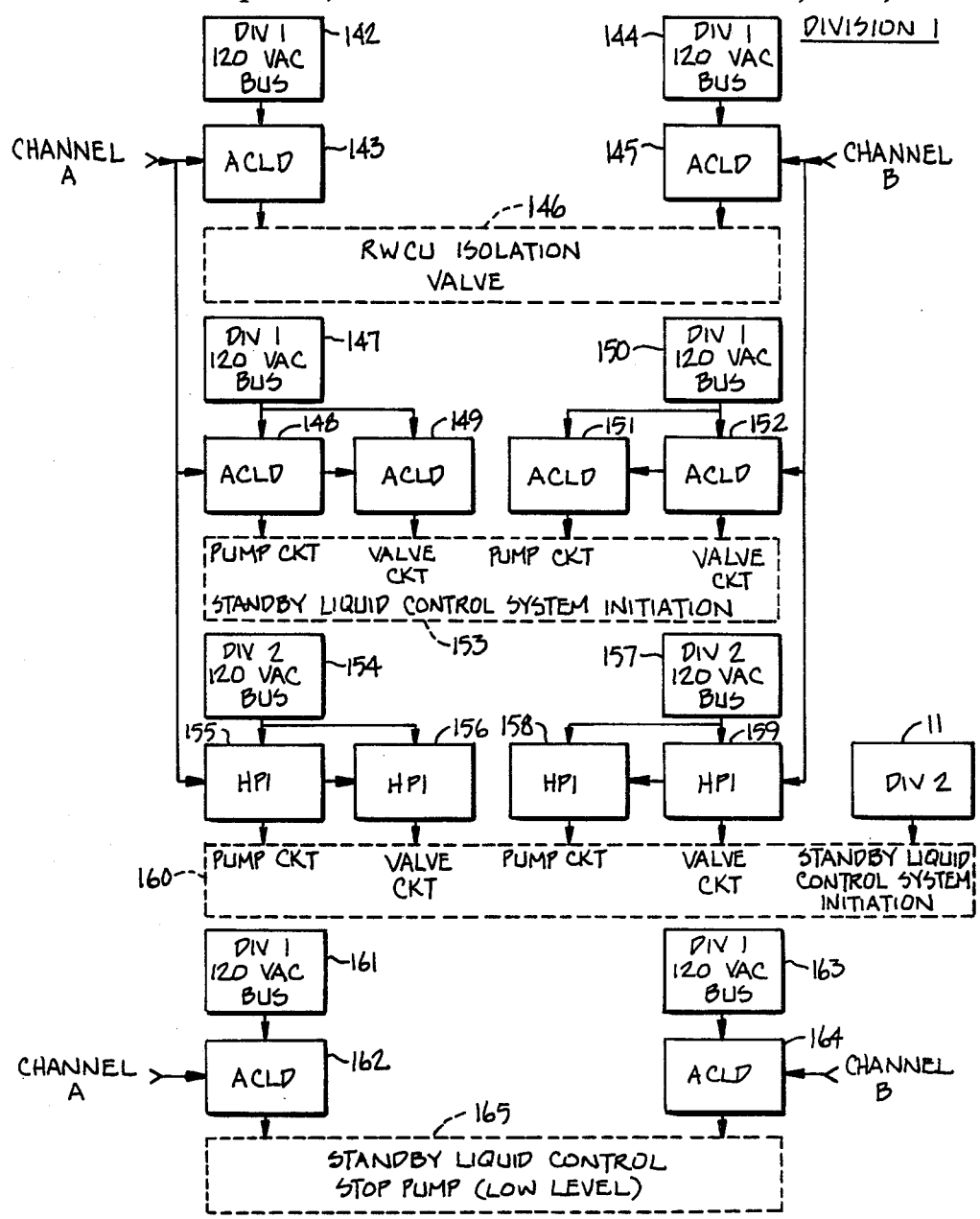
FIG._7.

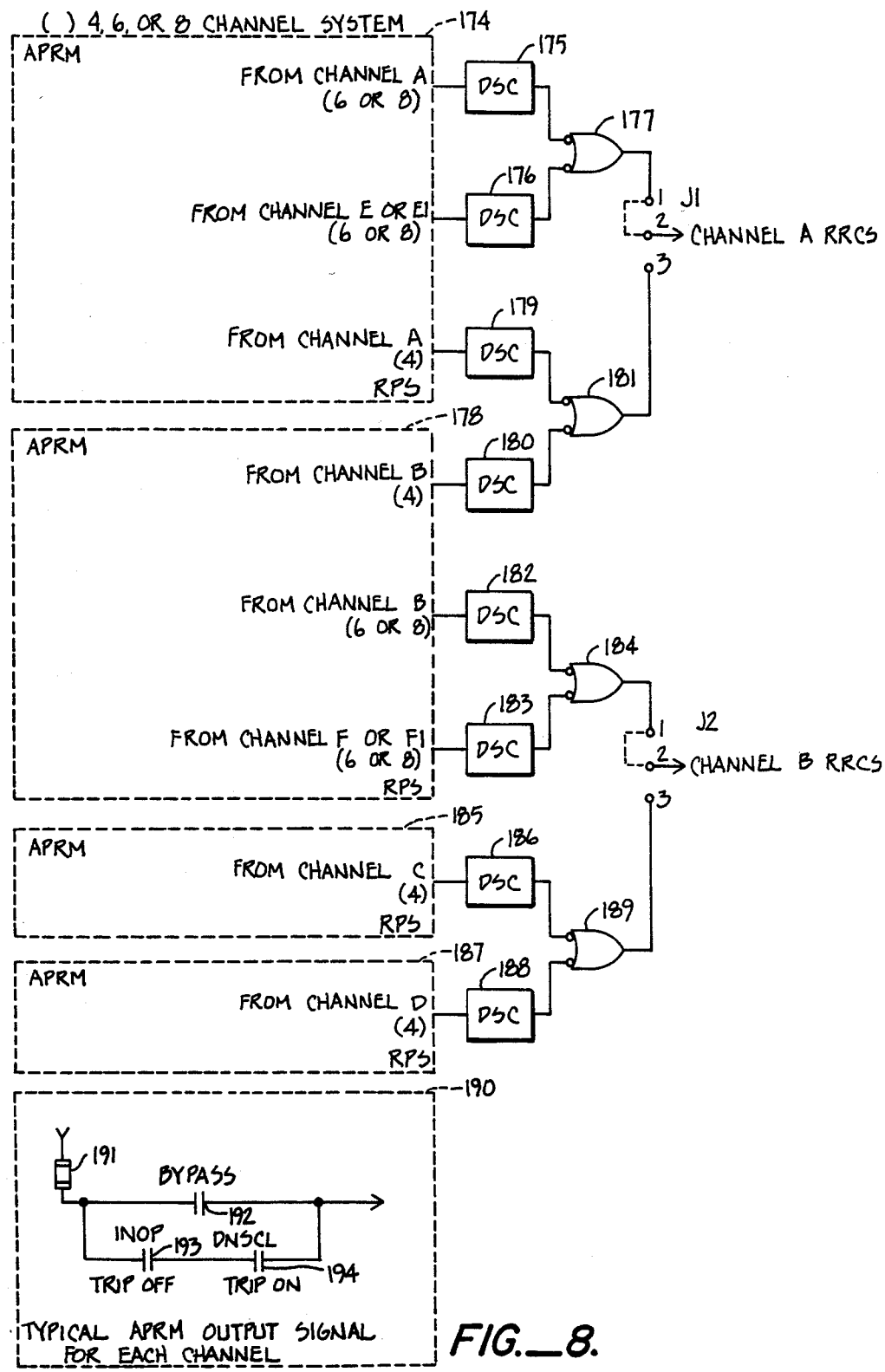
FIG._8.

REDUNDANT REACTIVITY CONTROL SYSTEM

BACKGROUND OF THE INVENTION

1. Field of the Invention

The present invention relates to boiling water nuclear reactors. More particularly, the present invention relates to a safety system for controlling reactivity by injecting liquid boron into a reactor core.

2. Description of the Prior Art

All nuclear power plants, both boiling water reactors (BWRs) and pressurized water reactors (PWRs) are designed for a forty year life time. In that life time, the plants are designed to handle a full series of anticipated transients—a component failure, an operator error, and anything else that would upset the power plant from its normal steady state operation. When a transient occurs, the power plant is designed to shut down by a process called scramming, i.e. rapid insertion of control rods into the plant reactor core.

For more than a decade, the members of Nuclear Regulatory Commission (NRC) have been concerned that an anticipated transient may occur where the control rods do not respond to a scram demand. That is, the reactor is in an upset condition and cannot be shut down in the normal mode by the insertion of control rods into the core. This concern by the NRC has resulted in the promulgation of "draft rules" imposing additional safety requirements upon nuclear power plant operators. The additional safety requirements serve to resolve the NRC's concern over anticipated transients without scram (ATWS).

Normal shut down (scram) inserts solid rods containing a reactivity control agent, such as boron, into the reactor core. The alternate means for controlling a reactor comprises a holding tank, outside of the reactor vessel, containing a solution having a liquid form of boron, such as sodium pentaborate. In the event of an ATWs event, personnel at the power plant normally operate a switch to activate a pump. The pump transfers the sodium pentaborate from the holding tank into the reactor core, thereby shutting down the reactor.

Inserting rods into a reactor normally shuts down the reactor, and the power can be restored by removing the rods within a very short time. This is because the rods are designed to be inserted and removed from the reactor. Pumping liquid sodium pentaborate into the reactor requires a major reactor cleanup effort that could take up to six months to complete. Since the average cost of nuclear plant down time is $400,000.00 per day (1983), reactor personnel generally think twice before actuating the sodium pentaborate pumps.

To arrive at the decision to initiate pumping of sodium pentaborate into a reactor core, plant personnel generally refer to three parameters—dome pressure, water level, and average power. Certain procedures are available to plant personnel that may prevent an upset of the reactor in the event that an ATWS event occurs. These procedures involve cutting the recirculation of water to the system by tripping the recirculation pumps, limiting the feed water flow, and alternate rod insertion. If all of these procedures fail, the plant personnel have the option to manually operate the standby liquid control system (SLCS) to pump liquid sodium pentaborate into the reactor.

The NRC rules require that such parameters as peak fuel temperature, peak suppression pool temperature, and radiation release to the public not exceed preset limits. The protocol, as of the origin of this invention, has not been dictated. Accordingly, the protocol herein was developed by the inventors herein, and not mandated by regulation.

SUMMARY OF THE INVENTION

The present invention is a redundant reactivity control system for a boiling water (BWR) nuclear power plant, which satisfies existing and proposed Nuclear Regulatory Commission requirements for response to anticipated transients without scram (ATWS). The redundant reactivity control system is intended to mitigate the potential consequences of an anticipated transient without scram event, such consequences possibly running into the millions of dollars. The system consists of control panels, and detection and actuation interface logic for performing specific functions in response to an ATWS event.

The present invention interfaces with a BWR nuclear reactor through the following systems: nuclear boiler system, neutron monitor system, standby liquid control system, control rod drive system, reactor recirculation system, reactor water clean-up system, feed water control system, and control room and local panels. The redundant reactivity control system (RRCS) is comprised of two divisionally separated control panels, associated detection and actuation logic, and the necessary interface logic to other reactor systems for performing specific functions in response to an ATWS event.

Each divisional control panel of the RRCS receives independent analog signals from high dome pressure transmitters, reactor low water level transmitters, and average power range monitor (APRM) down scale trip units. These inputs are combined and processed through solid state logic circuits to produce output actuation signals for interfacing systems. Each divisional panel has two independent logic channels which are combined in a two-out-of-two configuration to actuate various devices in existing plant systems. In the event of a single channel actuation, a single failure detection circuit operates appropriate alarm and monitoring equipment to notify plant personnel.

The RRCS provides class 1-E signals (essential for protection of the environment) through relay logic to actuate both standby liquid control system (SLCS) pumps and associated valves. Interlocks are provided to shut down the pumps at a preset low liquid level in a sodium pentaborate storage tank. The invention provides manual override of the automatic controls; valve position indication and status indication are also provided.

The RRCS automatically provides actuation signals to the alternate rod insertion (ARI) valves of the control rod drive (CRD) system to blow down the scram discharge air header and the scram discharge drive vent and drain valve air header. In this way, in the event of a control rod drive failure, the valve pilot pressure system is bled down, thereby allowing the rods to insert into a reactor shut-down position.

The RRCS automatically provides actuation signals to trip the reactor recirculation system pumps. Automatic signals to the existing recirculation pump-motor end-of-cycle (EOC) circuit breakers are provided from each divisional panel. The RRCS also provides a signal, through existing recirculation system flow logic, to transfer the recirculation pump motor power supply from the plant auxiliary bus to a low frequency motor generator (LFMG) set.

The RRCS logic provides actuation signals to the feed water control system to automatically stop feed water from flowing into the reactor vessel. The RRCS logic provides a signal that automatically transfers the control signal for the feed water turbine or the flow control valve from the automatic to the manual mode and simultaneously provides a zero feed water flow demand signal. Manual override is permitted after thirty seconds.

The RRCS logic provides actuation signals to isolate the reactor water clean-up system (RWCU) by closure of the RWCU inboard and outboard isolation valves. All related information is also transmitted to the control room annunciator, indication, etc., to advise the plant personnel of the situation.

The present invention monitors an ATWS event and runs the plant through all necessary shut-down procedures during the first two minutes of the condition to appropriately reduce plant reactivity, as indicated by the APRM. In the event of continued reactor upset, the invention automatically starts the SLCS system. At any point during an ATWS event, manual system operation may be initiated.

The present invention provides compliance with the proposed NRC rules while maximizing safety system efficiency to avoid the necessity of an expensive SLCS procedure. In the event of a reactor protection system failure (control rod failure), the present invention quickly and automatically brings the reactor under control by pumping the sodium pentaborate into the reactor core, but only after exhausting all other, less catastrophically expensive, methods of controlling the reactor.

BRIEF DESCRIPTION OF THE FIGURES

FIG. 1 is a simplified block diagram of the present invention showing a redundant two channel, two division, circuit arrangement and also showing a single failure detect circuit;

FIG. 2 is a logical block diagram of the present invention showing system operation and decision making;

FIG. 3 is a block schematic diagram showing one channel of a division of the present invention;

FIG. 4 is a block schematic diagram showing a reactor recirculation pump motor control circuit;

FIG. 5 is a block schematic diagram showing a reactor transfer pump motor to LFMG circuit, feed water control system circuit, and an ARI energize control circuit;

FIG. 6 is a block schematic diagram showing a reactor LFMG motor trip circuit;

FIG. 7 is a block schematic diagram showing an RWCU isolation control circuit and an SLCS control circuit; and FIG. 8 is a block schematic diagram showing a reactor APRM circuit.

DETAILED DESCRIPTION OF A PREFERRED EMBODIMENT

The present invention is a redundant reactivity control system that operates, in conjunction with other systems in a boiling water nuclear power plant, to mitigate the potential consequences of an anticipated transient without scram (ATWS) event. The present invention gathers and processes signal information to produce control signals that prevent an ATWS event by initiating an alternate rod insertion (ARI) system. Reactor shutdown is accomplished by automatically initiating liquid boron injection into a reactor core, along with limiting core reactivity by recirculation pump trip and feed water runback. The present invention is diverse from a typical reactor protection system (by which reactor control rods are operated), such that no credible failure can prevent both normal scram and ATWS prevention or mitigation functions. To this end, the present invention is intended for production as a Class 1E type device (i.e., essential for protection of the environment).

One factor indicative of an ATWS event is excessive reactor vessel dome pressure. Typically, high reactor vessel dome pressure activates the reactor protection system and initiates a scram. In the event of rod failure or reactor protection system failure, the reactor vessel dome pressure continues to rise above the first sensed high dome pressure level. Sensing a second high dome pressure level indicates an ATWS event.

Another factor indicative of an ATWS event is a low reactor vessel water level. As with high dome pressure, a first low water level is sensed, which initiates a scram sequence. If the scram fails to operate due to rod failure or reactor protection system failure, the water drops to a second level that indicates an ATWS event.

A further condition that may indicate an ATWS event is related to the reactor suppression pool. The suppression pool drains excessive energy from the reactor in the form of heat. A reactor failure may not initiate operation of the reactor protection system or of the present invention because the suppression pool is able to compensate for a reactor malfunction. The reactor appears to be operating properly and there is thus no sensor indication within the reactor of any trouble. However, the suppression pool's ability to control the reactor heat output is continually being reduced. In such a situation, a plant operator would be apprised of the loss of suppression pool capacity. In response, the plant operator would initiate a manual scram. In the event the automatic scram failed, the plant operator is able to operate the reactivity control system invention by means of a manual initiation sequence (as discussed below).

One further factor to be considered when providing the present reactivity control system is that of reactor neutron density, as indicated by an average power range neutron monitor. Such indication is representative of reactivity within the reactor's core. In the event of an ATWS event, there are procedures short of the standby liquid control system: boron injection (SLCS), that may bring an unbalanced reactor under control. If the reactor is being brought under control, monitored average power range is within an acceptable limit. Since SLCS actuation results in a lengthy, extremely expensive clean-up effort, all reactor control measures short of SLCS actuation are tried within the maximum prudent response interval before the SLCS is actuated. That is, SLCS actuation is considered a last resort.

The basic architecture of the redundant reactivity control system is shown in block form in FIG. 1. It can be seen that the present invention comprises a first division 10 including two channels: channel A (10A) and channel B (10B). The redundancy aspect of the present invention is provided by including two channels in division 1 that must agree, as determined by an AND function 16, before the ATWS event is detected and reported. Redundancy is further provided by having a second division 11, including two channels: channel A (11A) and channel B (11B). Division 2 also reports an ATWS event when both channel A and channel B of the division sense said event, as indicated at AND function 17.

A system failure reported by either division 1 or division 2 is reported as indicated by OR function 18. Any of the conditions discussed above—high dome pressure, low water level, provides indication of that fact. Manual initiation also signals an ATWS event, as shown by OR function 12, 12a.

The system is redundant by providing the two channels per division. To activate the system, an ATWS signalling event must occur which triggers both channels of the division 12, 12a. The channels themselves are separate and distinct, although they are housed in the same package. The second division is housed in an entirely different physical package; there are no connections between the divisions that would jeopardize the redundancy of the system. Because both channels in the division must vote to signal an ATWS event, a single failure signalled by one channel must be reported, as indicated by OR functions 14 and 15. Such single channel failure reporting is indicative of a failure within the reactivity control system. That is, if there is no ATWS event, then there is a spurious indication of such event by one of the channels. If there is an ATWS event, then there is a failure to report the event by one of the channels. In either case, a fault is indicated within the reactivity control system. Such a failure in one division does not effect operability of the other division.

A logical block diagram of the redundant reactivity control system is provided in FIG. 2. The portion of the invention shown in FIG. 2 is that of one channel in one division. The logical relationship between channels and divisions is shown in FIG. 1.

A high dome pressure function 20 is shown coupled to a trip recirculating pump function 32. Additionally, high dome pressure function 20 is shown coupled to an alternate rod insertion function 31 and a permissive average power range monitor (APRM) function 26a. When a high dome pressure above scram level is sensed, the reactor water recirculating pumps are tripped and the water flow is reduced from a 100% water flow to approximately a 25% water flow. Because nuclear power plants operate in the reverse of standard heat generating devices, the reduction of water flow through the reactor tends to slow or cool the reactor down. In the absence of water, the reactor would most likely cease operation.

A sensed high dome pressure also operates the alternate rod insertion system. Reactor control rods are solid state boron impregnated rods that are inserted into a reactor core to absorb radiation within the reactor and thus cool the reactor. In the event that the mechanical rod moving machinery fails, the rods may be inserted into the reactor by an alternate system wherein the rods are maintained under pressure. In the failure of normal rod insertion, pressure maintained on the rods is removed and the rods are allowed to coast into position. This function is shown as open ARI valve 37 in FIG. 2.

Finally, the effectiveness of the measures taken to cool an unbalanced reactor may be measured with an average power range monitor. Such a function is considered permissive in that sufficient reactor control, as indicated by the APRM system, denies permission for additional plant shutdown procedures.

In the event that tripping the recirculation pumps and attempting alternate rod insertion fails to produce an acceptable average power range, as indicated at permissive 26a, a timer 27 is actuated. The timer is normally set for a 30-second interval, after which time if the average power range is not brought within an acceptable level, a limit feed water flow function is initiated 33. The feed water flow applies water to the reactor through a water loop. By limiting the flow of cold feed water, reactor control is exercised. The 30 second interval represents an acceptable timing interval within the parameters dictated by the proposed Nuclear Regulatory Commission (NRC) rules. These rules propose several additional requirements for nuclear plant operation and are discussed further below.

When the interval of timer 27 has elapsed, a control signal is sent to a function for tripping the recirculation low frequency motor generates set (LFMG) 34. As mentioned above, the recirculating pumps are brought down in volume from 100% level to approximately 25% level. At the 25% level, the recirculating pumps are not longer efficiently controlled and from the 25% level down the LFMG sets are then operated to further reduce the recirculating water level and to thereby control reactor operation.

A low water level sensing function 22 is provided that operates the trip recirculation pump function 32, the trip recirculating LFMG function 34, and the alternate rod insertion function 31.

The low water level sensing function (as well as the high dome pressure function) is provided to a timer 26, which times an interval equal to approximately 2-minutes. At the end of the 2-minute interval, there is a test of an APRM permissive 28. If there is sufficient reactivity in the reactor, then the SLCS function 35 is started, provided there is enough sodium pentaborate in the tank as determined by tank level 29. A manual override function 30 is provided for operating the SLCS pumps. Additionally, an SLCS operation results in isolation of a reactor water clean-up (RWCU) system 36. The RWCU is isolated to prevent contamination of the system by the liquid boron injected into the reactor.

Finally, a manual reactivity control system function 24 is provided. Initiating this function operates the alternate rod insertion function 31 and provides a pathway, as described above, to start the SLCS function 35.

Channel A of division 1 is shown in block schematic form in FIG. 3. Reactor vessel high dome pressure transmitter 20 is shown coupled through an analog trip module (ATM) 45 to an OR gate 43. The output of high dome pressure transmitter 20 is also coupled to an inverting input of an AND gate 44, and a latch 48.

It should be noted that the functional box which indicates an ATM may be any type of device that provides a trigger signal when a preset level is approached. Such a device is the subject of U.S. patent application, Ser. No. 402,371, filed July 27, 1982, entitled, METHOD AND APPARATUS FOR GENERATING TRIP SIGNALS. Said patent application is commonly owned by the assignee of the present application, General Electric Company of Syracuse, N.Y. The herein mentioned copending patent application is considered to disclose matter that is nonessential to the proper understanding of the present invention. Said application is herein incorporated by reference. A portion of the referenced patent application, including the Summary and two claims thereof, follows:

From the summary:

"According to the invention, a device is provided for precision sensing of analog levels which can be tested by applying a short-duration test protocol to exercise and analyze all functions of the device and which automatically recovers to the precise state existent prior to the implementation of the test protocol. A time interval on the order of one millisecond is set aside for test pulse injection, settling time and recovery of the device to its initial state. Proper recovery of the device to its original state prior to test is critical to avoid the creation of state ambiguity due to programmed hysteresis in the analog trip levels. A specific embodiment of an analog trip module comprises preprocessing circuitry coupled to an analog signal source and to diagnostic test circuitry, and a circuit module coupled to receive signals from the preprocessing circuitry. The module includes a plurality of trip indicators and circuitry for detecting gross failures. The diagnostic circuitry operates to apply test signals to the preprocessing circuitry both for testing and for resetting the trip indicators."

From the claims:

"1. A self-testing apparatus for generating trip indications at precision analog levels, said apparatus comprising:

means responsive to an analog input function signal for generating a first positive trip indication signal at a first precise trip level as said analog input signal is changed;

means responsive to said analog input function signal for establishing a hysteresis threshold at a second precise trip level of said analog input signal when said analog input signal is maintained at a level beyond said first precise trip level for a minimum time period;

means connected to said first generating means for applying at any time a first diagnostic level signal beyond said first trip level for a time less than said minimum time period in order to prevent hysteresis regeneration; and means connected to said first and second generating means for monitoring substantially all operations of said generating means, said monitoring means being capable of functioning during any operation of said generating means without causing ambiguity among said trip levels."

6. A method for testing an apparatus for generating trip indications at precise analog levels, said apparatus exhibiting hysteresis between a first precise trip level and a second precise trip level only in response to input signals having a duration greater than a minimum time period, said method comprising the steps of:

applying at any time during operation of said apparatus a diagnostic level signal of a level beyond said first trip level for a period less than said minimum time period; and registering response of said apparatus to said diagnostic level signal within said minimum time period."

Returning now to the discussion of FIG. 3, the reactor vessel low water transmitter 22 is coupled through an ATM 57 to an inverting input of AND gate 44, a latch 58, OR gate 43, and an AND gate 62.

The redundant reactivity control system manual initiation function 24 is shown as a switch S1, including a power source 46 and a digital signal conditioner for switch contacts (DSC) 47.

The DSC is a type of device which detects a switch closure and produces an appropriate signal indicative thereof. The output from DSC 47 is coupled to OR gate 43, and latch 54. The load is switched by output load drivers. One such load driver switching device, for switching alternating current loads, is the subject matter of patent application Ser. No. 402,373, filed July 27, 1982, entitled, LOAD DRIVING CIRCUITRY WITH LOAD CURRENT SENSING. Said patent application is commonly owned by the assignee of the present invention and is incorporated by reference into the present application. Said referenced patent application is included for purposes of example and is considered to describe circuitry nonessential to the understanding of the present invention. A portion of the referenced application, including the Summary and a claim, follows:

From the summary:

"A circuit apparatus comprises a solid-state load driver for controlling AC current loads which may be coupled in series with a winding saturable-core reactor for sensing the presence or absence of load current. The load current and the load current monitor are both under control of relatively low level logic signals. Output circuitry provides a high level of isolation between the low level control logic circuitry and the high level current driving circuitry. The load driving circuitry can be tested by use of short-duration injecting signal testing techniques without degrading the load driving circuitry, and current can be sensed with negligible effect on the load circuit."

From the claims:

1. A circuit apparatus for driving a load in response to logic control signals, said circuit apparatus comprising:

field effect transistor means, said field effect transistor means responsive to input logic level signals for switching on and off an alternating current power source, said field effect transistor means being connected in series with said power source and said load, said power source and said load defining a load means having a first terminal and a second terminal, said field effect transistor means comprising a first field effect transistor having a first gate electrode, a first source electrode and a first drain electrode, and a second field effect transistor having a second gate electrode, a second source electrode and a second drain electrode, said first gate electrode being coupled to said second gate electrode and said first source electrode being coupled to said second source electrode, said first drain electrode being coupled to said first terminal of said load means, and said second drain electrode being coupled to said second terminal of said load means thereby to form a switched circuit for alternating current through said field effect transistor means which is responsive for switching to changes in voltage potential between said first and second source electrodes and said first and second gate electrodes."

Having described three of the possible inputs to the reactivity control system in a nuclear power plant—reactor vessel high dome pressure, reactor vessel low water level, and manual initiation—circuit operation in the event of such a signal event is now discussed.

Reactor vessel high dome pressure produces a signal which is provided to various gates. The signal output from ATM 45 to OR gate 43 is latched by cooperation of OR gate 43 with an AND gate 42. Said latched signal is provided to the alternate rod insertion system.

The latched signal is also provided to a timer 27 which provides a 30-second time-out. One output of timer 27 is coupled through an OR gate 41 to the AND gate portion 42 of the latch consisting of gates 42 and 43. The first output of timer 27 thereafter resets the latch and removes the alternate rod insertion signal from the alternate rod insertion system. A second output from timer 27 is coupled to gate 44. The output of gate 44 also includes a reactor vessel pressure high input and a reactor vessel low water level input. Thus, if after a 30 second interval, the reactor vessel pressure and water level are at acceptable levels, a redundant reactivity control system and a alternate rod insertion system reset status signal is produced.

The alternate rod insertion system may also be reset by a switch S2, which couples a power source 39 through an DSC 40 at gate 41. The alternate rod insertion system may be tested by operation of a key locked test switch S4, which is coupled through gate 43.

Sensing a reactor vessel high dome pressure also sets latch 48. The output of latch 48 is coupled through a gate 53 to provide a reactor water recirculating pump trip (RPT). The output of latch 48 is also coupled to an AND gate 56 which provides a test for SLCS actuation.

A high dome pressure signal from latch 48 also sets a timer 49, which times a 25 second interval. It should be remembered that all intervals herein chosen may be varied in accordance with the application to which the invention is put, but the herein cited timer intervals are considered to teach the best mode in view of the proposed NRC rules which the present invention is intended to accommodate.

The time-out of timer 49 is coupled to an AND gate 50. The other side of AND gate 50 is coupled to the average power rate monitor (APRM) system. In the event that the APRM indication is above an acceptable level and the 25-second timer has timed out, latch 51 is set and the output latch 51 is coupled through OR gate 52 to provide a reactor water recirculating pump for transfer to the low frequency motor generator set (RPP-LFMG). Additionally, the output of latch 51 trips the feed water runback control circuitry.

Finally, the output of latch 48 is coupled through an OR gate 55 to a timer 28, which has a 2-minute time-out period. The output of timer 28 is coupled to AND gate 56 along with the output signal from latch 48. Additionally, the APRM signal is provided at AND gate 56. In the event that the reactor vessel high dome pressure signal is tripped and actuation of the alternate rod insertion system, the recirculating pump trip, the low frequency motor generator set, and the feed water runback, does not reduce the APRM level, an output from an AND gate 56 is coupled through OR gate 60 to set latch 61. Once set, latch 61 actuates the SLCS and liquid boron is then pumped into the reactor core.

Because the cleanup effort after operation of the SLCS may run as long as six months at a rate of approximately $400,000.00 per day, an additional timer 21, which times a 10-minute interval, is coupled to an output of timer 28. In the event that the APRM level is acceptable (not high) after timer 21 has timed out, an AND gate 64 produces a channel ready for reset signal. The output of timer 21 is additionally coupled through OR gate 63 to SLCS latch circuit 61. The output of OR gate 63 may be used to reset latch 61. Additionally, a reset circuit for the reactivity control system is provided by switch S3 which couples a power source 65 through an DSC 66 and then to gate 63.

An additional factor that may interfere with SLCS operation is a sensed low sodium pentaborate level in an SLCS storage tank. Such a level is sensed by transmitter 29 which couples a signal through an ATM 38 to stop the pumps in the SLCS system. An override for this sense is provided.

Having thus described a typical sequence of operations involving an ATWS event sensed by reactor vessel high dome pressure, the system's response to a reactor vessel low water level is now described.

In the event that a reactor vessel low water level is sensed at transmitter 22 and a signal is produced at ATM 57 as discussed above, the following events occur: a signal is provided to OR gate 43, which is latched and which operates the alternate rod insertion system. A signal is also provided to a latch 58, which is coupled to OR gate 53 to operate the recirculation pump trip circuitry. Additionally, the signal from latch 58 is coupled through OR gate 52 to operate the LFMG set trip circuit.

The output of latch 58 is also coupled through OR gate 55 to operate timer 28. The output of the low water level transmitter is coupled to an AND gate 62. In the event of a timer 28 time-out and an unsatisfactory APRM level, gate 62 is satisfied and an output signal is coupled through OR gate 60 to set latch 61 and thereby operate the SLCS.

An output of the low water level transmitter is also coupled through a NOT input of AND gate 44 to operate the redundant reactivity control system and alternate rod insertion reset status circuit. In this embodiment of the invention, a sensed low water level does not trip the feed water run back circuit.

Initiation of a manual reactivity control system operation at switch S1 produces an output signal from DSC 47. The signal is coupled through OR gate 43 to operate the alternate rod insertion system. Additionally, the output of DSC 47 sets a latch 54, the output of which is coupled through OR gate 55 to timer 28, which sets a portion of AND gate 59. The output of latch 54 is also provided to AND gate 59. If the APRM signal is unsatisfactory, as provided to gate 59, then gate 59 is true and an output is coupled through OR gate 60 to set SLCS latch 60 and thereby activate the SLCS.

In the event of a reset by actuation of switch S3, latches 48, 51, 54, 58, and 61 are cleared and a reset condition may be reported.

The logic functions, such as latches and gates, described above may be implemented by use of discrete components, as is well known in the art. Additionally, the functions may be accomplished by means of programmable logic cards such as described in patent application Ser. No. 449,221, filed Dec. 14, 1982, entitled, UNIVERSAL LOGIC CARD. The above-noted patent application is commonly owned by the assignee of the present application and is cited as providing one example of a method by which the logic functions above-described may be accomplished. Because the above-cited patent application is given for purposes of illustration, it is not deemed to be drawn to matter that is essential for an understanding of the present invention. Said patent application is herein incorporated by reference. Portions of said referenced application, including the Summary and exemplary claims, follow:

From the summary:

"A universal logic card is disclosed which contains both pre-programmed functional circuitry for actuating channel logic and dedicated test circuitry for testing the functional circuits. This provides constant looping interrogation of the pre-programmed channel logic in absence of the system controller test. The disclosed card resides as a channel in a reactor protection system for a nuclear power plant. The card is pre-programmed in software read-only memory to act equivalent to discreting circuitry during actual plant operation. Additionally, the card responds to system controlled surveillance of the self-test system. In system controlled surveillance, a central microprocessor serially addresses system circuit cards such as the one disclosed and loads these cards at predetermined input points with test commands. The addressed cards are thereafter simultaneously activated by a system-wide command. A test pulse, whose duration is so short that it is in effect transparent to the system and therefore cannot cause overall operation, is released. The pulse passes through the pre-programmed channel logic on the universal card along the actual program actuated components to verify, on the real actuating path, the operating integrity of the system. After an appropriate response interval, the output state of the system is recorded in output registers and thereafter read under control from the controller computer. Finally, the programmed card in the absence of system-wide test is monitored by a looping secondary computer on the card and used exclusively for self-test purposes. This computer reads the card inputs and outputs, verifies the RAM and ROM memories, constantly monitors the system timers, and dependent upon overall state verifies the accuracy of transfer function within the card. This test circuitry is in effect disabled upon system controller testor only and even remains in operation during actual system manipulation using the programmed digital logic."

From the claims:

"1. A universal card for a nuclear reactor protection system comprising in combination:

digital logic inputs;

digital logic outputs programmable intelligence connecting said inputs and outputs capable of emulating a timed analog logic path between said inputs and outputs;

a monitoring controller means connected between said inputs and outputs independent of said system logic, said controller including cyclicing means for monitoring transfer functions across said programmable intelligence.

6. A self-test system for a nuclear reactor protection system (RPS) including a processor for generating a series of RPS test patterns and test vectors, said processor including a series of related expected test rsults;

a universal logic card having inputs and outputs with programmable digital intelligence therebetween, said intelligence including digital means for programming analog circuitry for executing transfer functions between said inputs and outputs;

a self-test controller connected independent of said digital logic means for conducting under (RPS) control tests;

means for gating selected tests data under said test controller into registers resident in said test intelligence;

means responsive to a pulse from a system controller for gating time transparent pulses in a transfer function across said inputs to said outputs and means for reading the output of said transfer function for comparison to transfer function results upon system controller poll; and a monitoring controller means connected between said input and output independent of said system logic, said controller including means for looping test of said transfer functions across said card.

9. In combination with the self-test system for a nuclear reactor protection system (RPS) including a processor for generating a series of RPS test patterns and test vectors said processor including a series of related expectant test results;

a plurality of cards coupled to said processor for receiving said test vectors and adapted to receive and store related actual test results from the RPS;

first means responsive to commands from said processor for selecting from said self-test elements those self-test elements corresponding to said RPS test patterns;

second means responsive to commands from said processor for generating a short duration test pulse transparent to RPS operation and adapted to effect insertion of said test vectors into the RPS by said self-test elements;

means coupled to said self-test element for monitoring said actual test results and coupled to said processor for comparing said actual test results with said expected test results, the improvement in said card means comprising programmable intelligence between input and output on said card means for receiving digital logic corresponding to discrete analog circuitry;

and monitoring means connected to said programmable digital logic for measuring at all times transfer functions across said programmed logic from input to output."

Channels A and B of division 1 are shown coupled through DC load driver (DCLD) circuitry to the recirculating pump motor trip relay in FIG. 4. The channel A signal is coupled through DCLD 69 and 74. When an actuating signal is present, the division 1 125 volt dc bus 68/73 is coupled through DCLD 69/74 to recirculating pump motor trip relays 72/77.

In order to operate the recirculating pump motor trip relays the channel B signal must also actuate DCLD 71/76 to couple the division 1 125 volt dc bus 70/76 to the recirculating pump motor trip relay 72/77. When both channel A and channel B trip signals are present, the recirculating pump motor trip relays are operated.

The recirculating pump motor may be operated downwardly from a 100% operational level to approximately a 25% level. As the pump motors approach an end of a cycle (EOC), an end-of-cycle trip relay is actuated by the channel A and channel B signals. The channel A signal operates DCLD 79/84 to couple a division 1 125 volt dc bus 78/83 to recirculating pump motor EOC trip relay 82/87. The channel B signal operates DCLD 81/85 to couple a division 1 125 volt dc bus 80/86 to the recirculating pump motor EOC trip relays. When both channel A and channel B signals are present, the trip relays are actuated.

After the recirculating pump end-of-cycle, a transfer is made to the low frequency motor generator set. Referring to FIG. 5, the channel A signal is shown coupled through High Power Isolator (HPI) 90/96 to route a nondivisional 125 volt dc bus 90/95 to HPI 91/96. The output of HPI 91 operates transfer pump motor to LFMG 94; the output of HPI 96 operates transfer pump motor to LFMG 99.

To complete operation of the transfer pump motor 94/99, the channel B signal must also be provided at HPI 93/98 to couple the non-divisional 125 volt dc bus 92/97 to the transfer pump motors. The transfer pump motors may also be operated by signals from division 2 (11).

The high power isolating circuits may be any of a kind that couple a high power source to an actuated device upon receipt of an actuating signal. Typical of such device is that described in patent application Ser. No. 442,395, filed Nov. 15, 1982, entitled, A TESTABLE OPTICALLY ISOLATED CONTROL CIRCUIT. Said patent application is commonly owned by the assignee of the present application and is herein incorporated by reference. Said incorporated application is included for purposes of illustration and example and is not considered to describe matter essential for an understanding of the present invention. Portions of said referenced patent application, including the Summary and exemplary claims, follow:

From the summary:

"This invention provides a testable optically isolated control circuit suitable for use in applications wherein a controlling station and a controlled device must be physically isolated from each other. The invention is particularly useful for applications in which a device is to be controlled which must be physically and electrically separate from the source of the control input, yet have the source continuously able to monitor the transmission, reception, and condition of the controlled device. Typical applications include the control of remotely situated electrical devices in nuclear power plants.

In one embodiment, the testable optically isolated control circuit of this invention includes first and second physically separated units, the first unit including: an input terminal for receiving a control signal, a first transmitter for transmitting the control signal to the second unit, a first sensor for monitoring the first transmitter and supplying a signal indicative of the state of the first transmitter, and a first receiver for receiving signals; and the second unit including: a second receiver for receiving signals from the first transmitter and controlling relay means in response thereto, a second sensor connected to the second receiver and the relay means for detecting their operation, and a second transmitter connected to the second sensor for transmitting signals therefrom to the first receiver. The first unit also includes terminals connected to receive signals from the first sensor and for the first receiver. In the preferred embodiments, each of the transmitters includes an oscillator and at least one logic gate coupled to the transmitter.

It is an object of this continuation-in-part to improve the isolation of an optically controlled circuit by providing a narrow bandpass input frequency detection circuit for the second receiver of the invention.

It is a further object to improve the operation verification of an optically-controlled relay by deriving the relay switch drive signal from a phase lock loop oscillator which also provides a precisely alternating verification signal to a second transmitter comprising two light-emitting diodes.

It is an additional object to verify in a more isolated manner the current flow through output contact by providing a transformer having two windings and passing the output contact current through one winding to choke the other winding carrying an alternating current to a second transmitter including a trigger and a light-emitting diode.

It is another object of this invention to provide a controlled relay circuit which dissipates less heat by the use of a full wave switch comprising a plurality of field effect transistors.

It is yet a further object of this invention to provide a fast turn-off circuit for a full wave switch.

The invention of this continuation-in-part obtains improved isolation, performance, and operation verification in an optically-controlled high current relay switch by providing a narrow bandpass tuned input filter, a phase-locked loop oscillator actuated by signals passing the input filter and producing a clock signal to drive later stages of the relay, switch elements comprising a plurality of low heat dissipating FET transistors, a fact turn-off circuit actuated by, and speeding up, a decrease in control voltage to the FETs, and an output current verification transformer which is saturated by the flow of output current and turns off the clock signal to an LED in the second transmitter which remains off while output current flows."

From the claims:

1. In an electronic relay switch of the type controlled by a precisely alternating optical input signal from, and providing reception and operation verification optical output signals to, a controller from which said relay switch is otherwise isolated to the greatest practical degree, said switch having isolated ground terminals, and full wave rectifying means to rectify said alternating signal into a switch contact control voltage, the improvement therewith comprising:

an input frequency detection circuit;

switch elements including first and second pluralities of hexfet transistors having drain leads connected to first and second nodes respectively, source leads connected to one of said isolated ground terminals, and gate leads connected to said rectifying means;

a fast turn-off circuit connected between said rectifying means and said gate leads; and operation verification means including a current sensing transformer having two windings, a first of said windings being connected in series between said first and second nodes, the second of said windings being connected in series between one of said isolated grounds and said input filter, whereby current in the first winding controls the voltage in the second winding and said voltage controls said operation verification optical signal.

6. A testable physically isolated control circuit for opening relays upon command and indicating the open state independent of connection to a circuit to be opened, said system comprising in combination:

first and second physically separated units, the first unit including: an input terminal for receiving a control input;

first transmission means for transmitting the control input to the second unit;

first and second receiving means for receiving signals indicating the operating state of said second unit; and, the second unit including;

third receiving means for receiving signals from the first transmission means and controlling the relay means to open said relay means in response thereto;

said second receiving means including a tuned circuit responsive to a discrete input signal from said first transmitting means and phase lock loop detection means for rejecting all but a narrow band pass receive signal;

second sensing means operatively connected to said receiving means of said second unit and said relay means for detecting the operation thereof, said second sensing means including an inductance saturated transformer connected for operable saturation upon failure of said relay to open;

and inhibiting means responsive to saturation of said transformer;

second transmission means operatively connected to said inhibiting means for transmitting a signal indicating the open state of said relay and for being inhibited upon failure of said relay to open."

FIG. 5 also shows a channel A signal coupled to HPI 101 for routing a non-divisional 125 volt dc bus 100 to a feed water control system 104. The channel B signal is coupled to HPI 103 to route non-divisional bus 102 to the feed water control system and thereby complete operation of said system. Division 2 (11a) may also operate the feed water control system for initiation of feed water run-back.

A division 1 125 volt dc bus 105 is shown coupled through circuit breakers 106, 109, 112 and 115 to a series of DCLDs. The channel A signal is provided to DCLDs 107, 110, 113 and 116. When the channel A signal is actuated, the DCLDs couple the power source from bus 105 to a next level of DCLD circuitry. The second level of DCLD circuitry is controlled by the channel B signal and includes DCLDs 108, 111, 114 and 117.

When both channel A and channel B signals are present they operate the alternate rod insertion system. The 125 volt dc bus is coupled to the alternate rod insertion solenoid valve energize circuit 118. Actuating these valves operates the alternate rod insertion system.

In the event of a transfer to LFMG, the LFMG motor trip relays are operated. FIG. 6 shows a channel A signal coupled to HPIs 121, 126, 131, and 136. The presence of the channel A signal actuates the HPIs to connect a non-divisional 125 volt dc bus 120, 125, 130, and 135 to the LFMG motor trip relays 124, 129, 134, and 139.

To fully operate the trip relay circuitry, the channel B signal must couple the non-division 125 volt dc bus 122, 127, 132, and 137 through HPIs 123, 128, 133, and 138 to the LFMG motor trip relays. Operation of the LFMG motor circuit is accomplished to bring the reactor under control. Division 2 (11) is shown in FIG. 6 as operating the LFMG motor trip relay circuit.

The present invention senses an ATWS event and actuates all possible systems to prevent the event. If all else fails, the stand-by liquid control system is operated. Referring to FIG. 7, the channel A and channel B signals are shown coupled to various components of the SLCS. The channel A signal couples a division 1 120 volt ac bus 142 through an ac load driver (ACLD) 143 to a reactor waste water clean-up isolation valve 146. The purpose of operating the RWCU isolation valve is to isolate the clean-up system from the reactor. In this way, the introduction of sodium pentaborate into the clean-up system is prevented and ultimate reactor clean up is simplified.

The channel A signal also operates a pair of ACLDs 148/149 to couple division 1 120 volt ac bus 147 to the stand-by liquid control system initiation circuit 153. ACLD 148 operates the pump circuit and ACLD 149 operates the valve circuit. Additionally, the channel A signal is coupled through HPI 155/156 to operate the stand-by liquid control system 160 in a similar manner.

The channel B signal operates ACLD 145 to couple division 1 120 volt ac bus 144 to the RWCU isolation valve 146. Additionally, the channel B signal is coupled to ACLD 152/151 to couple the division 1 120 volt ac bus 150 to the stand-by liquid control system initiation circuit 153. The channel B signal is also coupled through HPI 159 and 158 to connect the division 2 120 volt ac bus 157 to stand-by liquid control initiation 160. The division 2 circuit (11) is shown coupled to stand-by liquid control system 160.

In the event that there is insufficient sodium pentaborate in the stand-by liquid control system tanks (low level) the channel A signal is provided to ACLD 162 to couple the division 1 120 volt ac bus 161 to a stand-by liquid control stop pump 165. The channel B signal is connected to ACLD 164 to couple the division 1 120 volt ac bus 163 to the stand-by liquid control stop pump 165. In this way, operation of the stand-by liquid control system is interrupted to prevent damage to the stand-by liquid control system pumps. An override or manual SLCS 30 is shown in FIG. 1.

The average power range monitor circuitry is shown in block form in FIG. 8. A first average power range monitor 174 is shown in a form that may configured as a 4, 6, or 8 channel system. In a 6 or 8 channel format, a channel A output is coupled through DSC 175 to NOR gate 177. A channel E or E1 output is coupled through DSC 176 through NOR gate 177. A jumper J1 selects between the 6 or 8 channel output or a 4 channel output, discussed below. J1 couples the APRM signal to channel A in the redundant reactivity control system. It should be noted that channel designations for the APRM do not refer to the redundant reactivity control system channels but only refer to those channels in a reactor protection system.

APRM 174 shows a channel A output in a 4 channel configuration, which is coupled through DSC 179 to NOR gate 181. A second APRM 178 shows a channel B output in a 4 channel configuration, which is coupled through DSC 180 through NOR gate 181. The channel A and channel B outputs from the APRMs at NOR gate 181 are provided to jumper J1. The jumper is shown as dotted lines connected between terminals 1 and 2 for a 6 or 8 channel configuration. In a 4 channel configuration, the jumper is connected between terminals 2 and 3 to provide a channel A output from the APRM to the redundant reactivity control system.

APRM 178 provides a 6 or 8 channel output which is coupled through DSC 182 (channel D) and DSC 183 (channel F or F1) to NOR gate 184. The output of NOR gate 184 is provided to pin 1 of jumper J2. When a connection is made between pin 1 and pin 2 of jumper J2 a channel B output is provided to the redundant reactivity control system.

In a 4 channel reactor protection system APRM configuration, an APRM 185 provides a channel C output through DSC 186 to NOR gate 189. Additionally, an APRM 187 provides a channel D output through DSC 188 to NOR gate 189. In this configuration, a connection between pins 2 and 3 of jumper J2 supplies a channel B signal to the redundant reactivity control system.

Switch contacts for the APRM output signal are shown in circuit 190 as including a power source 191, a set of bypass contacts 192, and an operative trip-off set of contacts 193 and a down-scaled trip-on set of contacts 194. The APRM contacts are operated in response to monitored reactivity in the reactor system. Operation of the APRM and the reactor protection system are both well known in the art and may be any of the types currently commercially available from various manufacturers, such as General Electric of Syracuse, N.Y.

The present invention is a safety related Class 1E system used in boiling water nuclear power plants to mitigate radioactivity through insertion of sodium pentaborate. The insertion is made only after all other means of mitigation have not been able to reduce the radioactivity, i.e. control rod insertion, recirculation pump trip, feed water run-back. The need for insertion is greatest when all other means fail, but an inadvertent actuation is not desirable as once the insertion is made, the reactor would be down and a long and expensive recovery would be necessary to clean the sodium pentaborate from the reactor core. The automatic system provided by the present invention eliminates the human factor in making such decisions, while providing operation of all possible means of mitigation within maximum prudent time periods proposed by the NRC, before actuating insertion of sodium pentaborate.

The foregoing was given for means of illustration of an exemplary embodiment of the invention. There are modifications to the invention that present themselves when the invention is adapted for use with specific nuclear power plants. Such changes require only ordinary skill. Therefore, the scope of the invention should be limited only by the breadth of the claims.

We claim:

1. A reactivity control system for a nuclear reactor, comprising:
   sensors for monitoring critical reactor operating parameters and for sensing conditions indicative of an anticipated transient without scram (ATWS) event;
   means for monitoring average reactor power range;
   a timer, defining a reactor interval during which monitored average reactor power range must settle within a selected safe reactor operation limit;
   means for actuating reactor safety systems in response to a sensed ATWS event; and
   means for indicating needed operation of a reactor standby safety system at the end of said timer reactor interval when said monitored average power range has not settled within said selected safe reactor operation limit in response to actuation of said reactor safety systems.

2. The reactivity control system of claim 1, and wherein said standby safety system means for operating an alternate reactor rod insertion system in response to an indicated ATWS event.

3. The reactivity control system of claim 1 and wherein said standby system comprises means for tripping a reactor water recirculating pump system in response to an indicated ATWS event.

4. The reactivity control system of claim 1, and wherein said standby safety system comprises means for tripping a reactor water recirculating low frequency motor generator in response to an indicated ATWS event.

5. The reactivity control system of claim 1, and wherein said standby safety system comprises means for limiting reactor feedwater flow in response to an ATWS event.

6. The reactivity control system of claim 1, said sensors further comprising means for monitoring a reactor high-dome pressure condition.

7. The reactivity control system of claim 1, said sensors further comprising means for monitoring a reactor low-water condition.

8. The reactivity control system of claim 1, said sensors further comprising means for monitoring a manual reactivity control system actuation.

9. The reactivity control system of claim 1, having two identical control system divisions, each division comprising two separate, identical reactivity control system channels wherein an actuating ATWS is reported when simultaneously sensed by both channels.

10. A reactivity control system for nuclear reactors, comprising:
   two separate, identical reactivity control system divisions, each division comprising two separate, identical reactivity control system channels, each of said channels including:
   (a) sensors for monitoring critical reactor operating parameters and for sensing conditions indicative of an anticipated transient without scram (ATWS) event;
   (b) means for monitoring average reactor power range; and
   (c) a timer, defining a reactor interval during which monitored average power range must settle within a selected safe reactor operation limit;
   each division including:
   (a) means for actuating reactor safety systems in response to an ATWS event that is simultaneously sensed by both channels within a division; and
   (b) means for indicating needed operation of a reactor standby liquid control system at the end of said timer reactor interval when said monitored average power range is not settled within said selected safe reactor operation limit in response to actuation of said reactor safety systems; and
   means for reporting a reactivity control system failure when an ATWS event is sensed by only one of two channels within a division.

11. In a boiling water nuclear reactor, a reactivity control system, comprising:
   sensors for monitoring a reactor high-dome pressure condition, a reactor low water condition, and a manual reactivity control system actuation, said conditions and actuation being singly, and in combination, indicative of a detected anticipated transient without scram (ATWS) event;
   means for operating an alternate reactor rod insertion system in response to a detected ATWS event;
   means for tripping a reactor water recirculating pump system in response to a sensed reactor high dome pressure condition;
   means for tripping said reactor water recirculating pump system in response to a sensed reactor low water level condition;
   means for tripping a reactor water recirculating low frequency motor generator (LFMG) in response to a sensed reactor low water condition;
   means for continuously monitoring average reactor power range;
   a first timer, defining a first reactor response interval during which a monitored average power range must settle within a selected safe reactor operation limit;

means for limiting reactor feed-water flow in response to a first timer time-out;

means for tripping said reactor water recirculating LFMG in response to a first timer time-out;

a second timer, defining a second reactor response interval of greater duration than said first reactor response interval during which said monitored average power range must settle within said selected safe reactor operation limit; and means for operating a reactor standby liquid control system (SLCS) in response to a second timer time-out.

12. The reactivity control system of claim 11, further comprising override means for manually operating said SLCS.

13. The reactivity control system of claim 12, further comprising means for manually resetting said alternate control rod insertion system.

14. The reactivity control system of claim 13, further comprising:

a third timer, defining a third reactor response interval and for resetting said alternate control rod insertion system at the end of said interval in the absence of a sensed continued ATWS event.

15. The reactivity control system of claim 14, further comprising:

a fourth timer, defining a reactor response interval, said timer resetting said reactivity control system at the end of said interval in the absence of a continued ATWS event.

16. The reactivity control system of claim 15, further comprising:

means for monitoring the level of liquid in a SLCS storage tank and for interrupting SLCS operation in the absence of a selected liquid level within the said tank.

17. The reactivity control system of claim 16, further comprising:

means for terminating operation of a reactor water cleanup system during operation of said SLCS.

18. A method for controlling nuclear reactor reactivity, comprising:

monitoring critical reactor operating parameters;

sensing conditions indicative of an anticipated transient without scram (ATWS) event;

monitoring average reactor power range;

timing a reactor interval during which monitored average power range must settle within a selected safe reactor operation limit;

actuating reactor safety systems in response to a sensed ATWS event; and operating a reactor standby liquid control system at the end of said interval when said monitored average power range does not settle within a selected safe reactor operation limit in response to actuation of said reactor safety systems.

19. The method of claim 18, further comprising operating an alternate reactor rod insertion system in response to an indicated ATWS event.

20. The method of claim 18, further comprising tripping a reactor water recirculating pump system in response to an indicated ATWS event.

21. The method of claim 18, further comprising tripping a water recirculating low-frequency motor generator in response to an indicated ATWS event.

22. The method of claim 18, further comprising limiting reactor feed-water flow in response to an indicated ATWS event.

23. The method of claim 18, said monitored critical reactor operating parameters comprising reactor high-dome pressure.

24. The method of claim 18, said monitored critical reactor operating parameters comprising reactor low-water.

25. The method of claim 18, further comprising monitoring a manual reactivity control system actuation.

26. The method of claim 18, further comprising:

providing two identical reactivity control system divisions, each division comprising two separate, identical reactivity control system channels; and reporting an actuating ATWS event when said event is simultaneously sensed by both channels.

27. A method for controlling nuclear reactor reactivity, comprising:

providing two separate, identical reactivity control system divisions, each division comprising two separate identical reactivity control system channels, each of said channels operating according to the following method:

(a) monitoring critical reactor operating parameters;

(b) sensing conditions indicative of an anticipated transient without scram (ATWS) event;

(c) monitoring average reactor power range; and (d) timing reactor interval during which monitored average range must settle within a selected safe reactor operation limit;

actuating reactor safety systems in response to an ATWS event simultaneously sensed by both channels within a division;

operating a reactor standby liquid control system at the end of said interval when said monitored average power range does not settle within the selected safe reactor operation limit in response to actuation of said reactor safety systems; and reporting a reactivity control system failure when an ATWS event is sensed by only one of said two channels of a division.

28. The reactivity control system of claim 1 and including means for indicating needed operation of said reactor standby safety system.

* * * * *